(12) United States Patent
Romanek

(10) Patent No.: US 6,289,916 B1
(45) Date of Patent: Sep. 18, 2001

(54) VENTILATING DEVICE FOR MOTOR VEHICLE FUEL TANK

(75) Inventor: Christian Romanek, Noailles (FR)

(73) Assignee: Compagnie de Materiel et d'Equipements Techniques C.O.M.E.T., Senlis (FR)

(*) Notice: Subject to any disclaimer, the term of this patent is extended or adjusted under 35 U.S.C. 154(b) by 0 days.

(21) Appl. No.: 09/647,074

(22) PCT Filed: Mar. 26, 1999

(86) PCT No.: PCT/FR99/00710

§ 371 Date: Nov. 29, 2000

§ 102(e) Date: Nov. 29, 2000

(87) PCT Pub. No.: WO99/50086

PCT Pub. Date: Oct. 7, 1999

(30) Foreign Application Priority Data

Mar. 27, 1998 (FR) ................................................. 98 04019

(51) Int. Cl.[7] ................................................ G05D 27/00

(52) U.S. Cl. .................... 137/43; 137/38; 137/587

(58) Field of Search ........................ 137/43, 38, 587

(56) References Cited

U.S. PATENT DOCUMENTS

| 4,756,328 | | 7/1988 | Sherwood . | |
|---|---|---|---|---|
| 5,518,018 | * | 5/1996 | Roetker | 137/43 |
| 5,666,989 | * | 9/1997 | Roetker | 137/43 |
| 5,687,778 | * | 11/1997 | Harris | 141/59 |

FOREIGN PATENT DOCUMENTS 2 740 402    4/1997   (FR) .

* cited by examiner

*Primary Examiner*—Michael Powell Buiz
*Assistant Examiner*—Thomas L. McShane
(74) *Attorney, Agent, or Firm*—Lowe Hauptman Gilman & Berner, LLP

(57) ABSTRACT

The invention concerns a ventilating device for a motor vehicle fuel tank, wherein a valve (12) is provided with a counter-weight (22) which, when the vehicle is not running in a substantially horizontal position, causes the valve (12) to be closed, and which, when the vehicle is running, causes the valve (12) to open. The invention is characterised in that the counter-weight (22) is supported on the upper concave surface (24) of a spring retainer (20) whereof one lower surface comprises means for closing the valve (12), and when the counter-weight (22) is spaced from its stable equilibrium position by vibrations, it makes the spring retainer (20) tilt so as to cause the valve (12) to be opened.

8 Claims, 1 Drawing Sheet

VENTILATING DEVICE FOR MOTOR VEHICLE FUEL TANK

Figure 1:
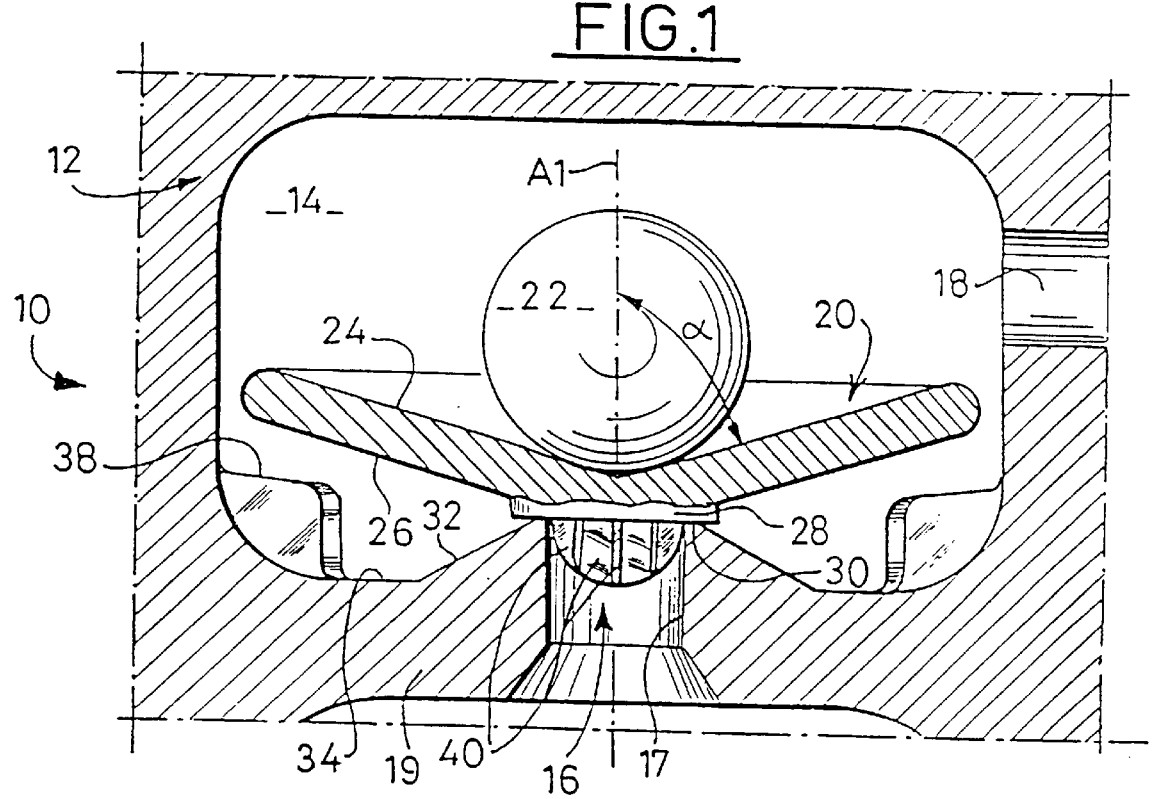

The invention relates to a venting system for an automobile vehicle fuel tank.

The invention relates more particularly to a venting system for an automobile vehicle fuel tank, of the type in which a valve is provided with a weight in a chamber into which open an inlet orifice connected to the tank and an outlet orifice, the weight of the weight causes it to close the valve when the vehicle is stopped and in a substantially horizontal position, and vibration generated when the vehicle is started or is moving causes the weight to open the valve and vent the tank.

In prior art systems the weight generally takes the form of a spherical ball which rolls on a concave frustoconical surface which is wider at the top and is formed on a bottom horizontal wall of the valve chamber. The orifice which is closed by the ball is at the center of the frustoconical surface.

When the vehicle is stopped and in a substantially horizontal position the weight of the ball causes it to rest at the center of the frustoconical surface, with which it is in bearing engagement around a circle.

Accordingly, the sealing effect of closure by the ball is conditioned by the geometry of the ball and the geometry of the frustoconical surface. In the event of a geometrical defect, contact between the ball and the frustoconical surface does not extend all around the theoretical circle of contact.

An object of the invention is therefore to propose a new simple and economical venting system which can provide a seal between the fuel tank and the atmosphere.

To this end, the invention proposes a venting system for an automobile vehicle fuel tank, of the type in which a valve is provided with a weight in a chamber into which open an inlet orifice connected to the tank and an outlet orifice, the weight of the weight causes it to close the valve when the vehicle is stopped and in a substantially horizontal position, and vibration generated when the vehicle is started or is moving causes the weight to open the valve and vent the tank, characterized in that the weight bears on a concave top face of a cup whose bottom face includes closure means adapted to cooperate with a seat formed in a valve body to shut off one orifice of the valve when the cup is maintained in a closing position by the weight in a stable equilibrium position at the bottom of the top concave surface, and in that when the weight is shifted from its stable equilibrium position by vibration it tilts the cup to interrupt the cooperation of the closure means with the seat and thereby open the valve.

According to other features of the invention:

the cup is substantially conical with a vertical axis;

the bottom face of the cup has a plane annular bearing surface which, in the closing position of the cup, cooperates with an annular seat formed around an orifice in a bottom horizontal wall of the chamber;

the seat is raised relative to a top face of the bottom wall of the chamber;

the seat is formed by the intersection of a vertical inside cylindrical surface which delimits the orifice to be closed and a convex frustoconical surface which faces upward, is coaxial with the cylindrical surface and extends above the top face of the bottom wall of the chamber;

the cup includes a centering member which extends downward through the orifice to be closed and which cooperates with an edge of the orifice to center the cup at least when the cup is in the closing position;

the centering member is at the center of the annular bearing surface;

the chamber includes abutment means which limit the angle of tilting of the cup.

Figure 2:
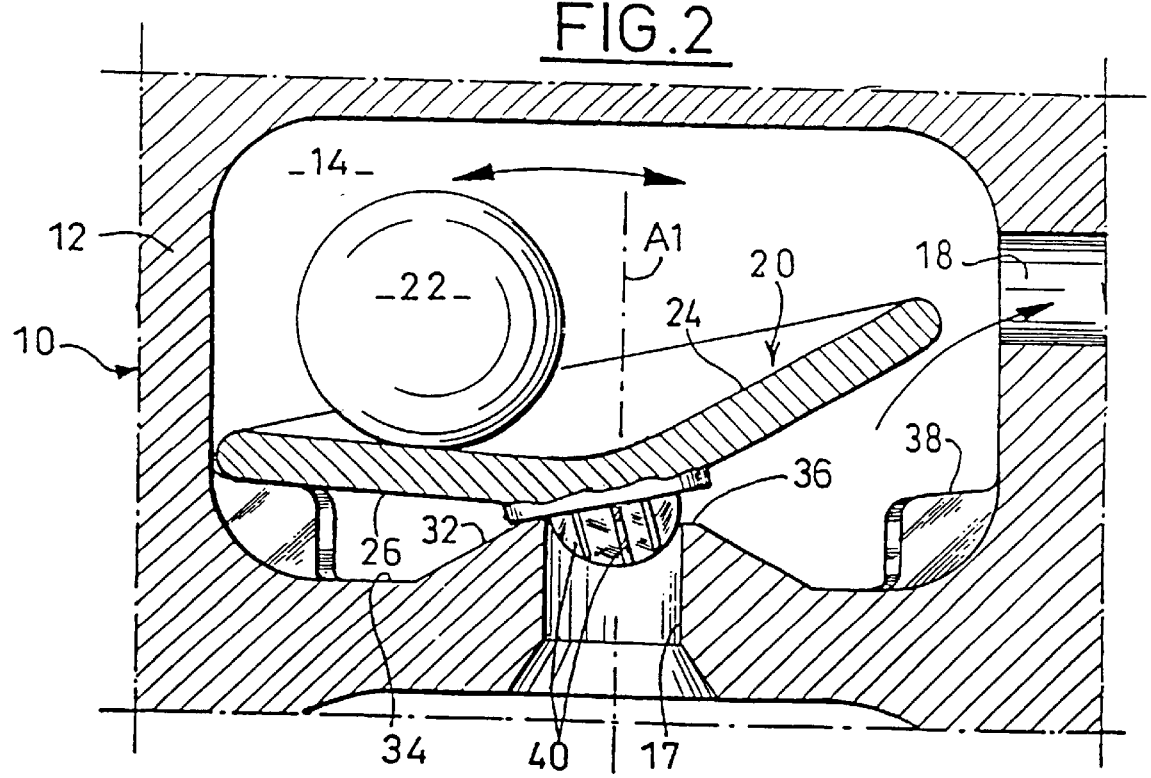

Other features and advantages of the invention will become apparent on reading the following detailed description, which refers to the accompanying drawings, in which:

FIG. 1 is a diagrammatic sectional view on a vertical plane of a venting system according to the invention, shown when the vehicle is stopped and in a substantially horizontal position; and FIG. 2 is a view similar to that of FIG. 1 showing the system when the vehicle is moving.

In a manner that is known in the art, for example as described in the document FR-A-2 740 402, automobile vehicle fuel tanks are usually provided with a venting system which includes a vent pipe which has a bottom portion which opens into the tank, at the top of the tank, and a bottom portion which is connected to a vapor recovery and filtering system, for example. A valve is provided between the top and bottom portions of the vent pipe.

The venting system compensates the drop in the fuel level in the tank by allowing air to enter the tank so that the pressure therein is substantially constant.

In contrast, to prevent deformation of the tank that could cause it to rupture, the system must also enable evacuation of gases compressed because of a temperature rise, for example.

However, it is desirable for the vapor contained in the tank to be unable to escape directly to the atmosphere when the vehicle is at rest, whether by evaporation or when filling the tank with fuel.

The venting system 10 shown partly in FIGS. 1 and 2 therefore includes a valve 12 for shutting off the venting circuit when the vehicle is stopped.

The valve 12 includes a chamber 14 which has at least one inlet orifice 16 and one outlet orifice 18. The inlet orifice 16 passes through a bottom horizontal wall 19 of the chamber 14 and has an axis A1 and an inside cylindrical surface 17 and is connected to the fuel tank, for example. The outlet orifice 18 opens onto a lateral or top wall of the chamber 14, for example.

According to the teachings of the invention, the outlet orifice 16 is adapted to be blocked by a cup 20 which can be tilted between a closing position shown in FIG. 1 and an opening position shown in FIG. 2 by a weight or ball 22 whose weight causes it to bear on a top face 24 of the cup 20.

The cup 20 is substantially a circular cone whose axis coincides with the axis A1 when the assembly is in the closing position shown in FIG. 1.

The conical top face 24 of the cup 20 is therefore concave, has its wider end at the top, and has a half-angle α at the apex. The bottom face 26 of the cup 20 is substantially parallel to the top face 24, and the cup 20 therefore substantially forms a conical plate of constant thickness. However, the bottom face 26 carries a central boss 28 which has a plane horizontal bottom face 30 forming a bearing surface.

The bottom wall 19 of the valve 12 therefore has, substantially at its center, a convex frustoconical surface 32 upstanding from the top face 34 of the wall 18, whose axis is the axis A1, and which has its wider end at the bottom.

Where the orifice 16 opens into the chamber 14, the intersection of the cylindrical wall 17 with the frustoconical surface 32 of the bottom wall 18 forms a seat 36 on which the bottom bearing surface 30 of the cup 20 bears. Note that the seat 36, which is formed at the intersection of two surfaces at an acute angle, can take the form of a circular lip or an annular chamber whose axis is the axis A1.

The contact between the seat 36 and the bearing surface 30 is therefore either a circle or a ring.

As shown in the figures, the diameter of the two contact surfaces is very much less than the transverse dimension of the chamber 14 and the cup 20. Accordingly, if the weight 22 is moved away from its stable equilibrium, i.e. if it is moved radially outward relative to the axis A1 of the top surface 24 by a distance greater than the radius of the contact surfaces 30, 36, the weight of the ball 22, which is very much greater than that of the cup 20, tends to tilt the latter toward an opening position, shown in FIG. 2, in which the bearing surface 30 is lifted off the seat 36 except at one point. Gas can therefore flow freely through the valve 12, out of or into the tank.

Abutments 38 upstanding from the top face 34 of the bottom wall 18 of the chamber 14 limit the angle to which the cup 20 can tilt. In the embodiment shown in the figures, the abutments 38 are adapted to cooperate with the outside radial edge of the cup 20 and are at a level higher than the level of the seat 36. To be more precise, the abutments 38 are such that, when the cup 20 is in the open position, the radius of its top surface 24, which has the shallowest slope, nevertheless has sufficient slope in the centripetal direction for the weight 32 to tend to return to the center of the top surface 24.

The cup 20 is also provided with centering means which hold it substantially centered on the axis A1 so that, when the weight 22 is at the center of the top face 24, the action of the weight 22 on the cup 20 necessarily returns it to its closing position, shown in FIG. 1. The thrust exerted by the weight 22 on the cup 20 must then be inside the circle defined by the seat 36.

In the embodiment shown in the figures, the centering means comprise a series of fins 40 projecting downward from the center of the bottom surface 30. The fins 40 are arranged in a network of mutually perpendicular vertical planes and are entirely contained within a theoretical envelope surface centered on the axis A1.

The diameter of the spherical envelope is substantially equal to that of the inside cylindrical surface 17 delimiting the orifice 16 so that, when the cup 20 is in the closing position, the fins 40 center the cup 20 perfectly on the axis A1. When the cup 20 is in the opening position the fins 40 remain at least partially engaged within the orifice 16 but, because they do not have a continuous surface, they do not oppose free flow of the gas through the orifice 16, and the gas can therefore be evacuated from the tank to the outside.

The lateral surface which delimits the chamber 14 preferably has a profile in section in a transverse plane perpendicular to the axis A1 corresponding to that of the outside peripheral edge of the cup 20.

The weight 22 is preferably substantially spherical, but, in contrast to the prior art system, it is not necessary for the sphere to be geometrically perfect.

The valve 12 is sealed by the contact between the seat 36 and the bearing surface 30 of the cup 20. These components are molded from plastics materials, for example, and can very easily have sufficient geometry to provide a very good seal.

Also, the cup 20 can be made from a rubber-like material to improve the seal where it is in contact with the seat and to reduce significantly the noise generated by successive tilting of the cup. The cup 20 could also be made from a rigid material partly or entirely covered with a rubber-like material.

Of course, the design of the closure means of the valve 12 just described can be used in venting systems also incorporating other functions. In particular, this design can be used in venting systems in which the weight 22 also has the function of closing a needle valve in the event of the vehicle overturning.

What is claimed is:

1. A venting system for an automobile vehicle fuel tank, of the type in which a valve (12) is provided with a weight (22) in a chamber (14) into which open an inlet orifice (16) connected to the tank and an outlet orifice (18), the weight of the weight (22) causes it to close the valve (12) when the vehicle is stopped and in a substantially horizontal position, and vibration generated when the vehicle is started or is moving causes the weight (22) to open the valve (12) and vent the tank, characterized in that the weight (22) bears on a concave top face (24) of a cup (20) whose bottom face (26) includes closure means (30) adapted to cooperate with a seat (36) formed in a valve body to shut off one orifice (16) of the valve (12) when the cup (20) is maintained in a closing position by the weight (22) in a stable equilibrium position at the bottom of the top concave surface (24), and in that when the weight (22) is shifted from its stable equilibrium position by vibration it tilts the cup (20) to interrupt the cooperation of the closure means (30) with the seat (36) and thereby open the valve (12).

2. A venting system according to claim 1, characterized in that the cup (20) is substantially conical with a vertical axis (A1).

3. A venting system according to claim 2, characterized in that the bottom face (26) of the cup (20) has a plane annular bearing surface (30) which, in the closing position of the cup, cooperates with an annular seat (36) formed around an orifice (16) in a bottom horizontal wall (19) of the chamber (14).

4. A venting system according to claim 3, characterized in that the seat (36) is raised relative to a top face (34) of the bottom wall (19) of the chamber (14).

5. A venting system according to claim 4, characterized in that the seat (36) is formed by the intersection of a vertical inside cylindrical surface (17) which delimits the orifice (16) to be closed and a convex frustoconical surface (32) which faces upward, is coaxial with the cylindrical surface (17) and extends above the top face (34) of the bottom wall (19) of the chamber (14).

6. A venting system according to claim 1, characterized in that the cup (20) includes a centering member (40) which extends downward through the orifice (16) to be closed and which cooperates with an edge of the orifice (16) to center the cup (20) at least when the cup (20) is in the closing position.

7. A venting system according to claim 6 in conjunction with claim 3, characterized in that the centering member (40) is at the center of the annular bearing surface (30).

8. A venting system according to claim 1, characterized in that the chamber (14) includes abutment means (38) which limit the angle of tilting of the cup (20).

* * * * *